Patented May 26, 1936

2,042,221

UNITED STATES PATENT OFFICE 2,042,221

PRODUCTION OF UNSATURATED ESTERS AND PRODUCTS THEREOF

Herbert P. A. Groll, Oakland, and George Hearne, Berkeley, Calif., assignors to Shell Development Company, San Francisco, Calif., a corporation of Delaware No Drawing. Application June 5, 1934, Serial No. 729,112

14 Claims. (Cl. 260—106)

This invention relates to a novel process for effecting the esterification of unsaturated alcohols of other than the allyl type and embraces certain new and useful unsaturated esters and their mode of preparation.

More particularly our invention is concerned with a process for the production of unsaturated esters which comprises effecting the reaction of unsaturated alcohols wherein a carbinol group is attached to a saturated carbon atom with a carboxylic acid.

According to the present invention, the alcohols of the type herein described may be readily and substantially completely esterified by the simple procedure of heating the alcohol in contact with the carboxylic acid in the presence or absence of an esterification catalyst.

An object of our invention is to provide an economical and practical process adaptable to the commercial production of hitherto difficultly obtainable and in some cases unknown unsaturated carboxylic acid esters.

The unsaturated alcohols which may be esterified by our method contain at least one carbinol group linked to a saturated carbon atom and one or a plurality of double and/or triple unsaturated bonds. The alcohol may comprise an iso or normal alkyl chain which may or may not be attached to a cyclic radical as of the aromatic, alicyclic and heterocyclic series, or may comprise an alicyclic structure. The carbinol group or groups may be of primary, secondary or tertiary character.

Suitable unsaturated alcohols which we may employ in the execution of our invention include among others compounds such as $CH_2=CH-CH_2-CH_2OH$, $CH_2=CH-CH_2-CH_2-CH_2OH$,
$CH_3-HC=CH-CH_2-CH_2OH$, $CH_2=CH-CH_2-CHOH-CH_3$,
$CH_2=CH-CH_2-COH-CH_3$,
$\qquad\qquad\quad CH_3$
$CH_2=CH-CH=CH-CH_2-CH_2OH$, $CH_2=C-CH_2-CH_2OH$,
$\qquad\qquad\qquad\qquad\qquad\qquad\qquad\qquad CH_3$
$\qquad CH_2=C-CH_2-CHOH-CH_3$,
$\qquad\qquad\quad CH_3$
$\qquad\quad CH_2=CH-CH_2-CHOH-CH_2-CH=CH_2$,
$CH_2=C-CH_2-COH-CH_3$, $CH_2=C-CH_2-CH_2OH$,
$\quad\;\; CH_3\quad CH_3\qquad\qquad C_2H_5$
$\qquad\qquad CH_2=C-CH_2-CH_2OH$,
$\qquad\qquad\qquad\;\; CH_2-CH_2OH$
$CH_2=CH-CH_2-CHOH-CH_2OH$, $CH\equiv C-CH_2-CH_2OH$,
$\qquad CH_3-CH_2-C\equiv C-CH_2-CH_2OH$ and the like and their homologues, analogues and suitable substitution products such as the halides.

We are particularly interested in those unsaturated alcohols of the type herein described which possess an unsaturated tertiary carbon atom. These alcohols are, by our method, readily esterified in the absence of an esterification catalyst at relatively low temperatures to yield unsaturated esters many of which are novel compositions of matter.

Our invention may be successfully executed with any of the herein described unsaturated alcohols, but we have found that when straight chain monohydric alcohols of primary character such as $CH_2=CH-CH_2-CH_2OH$ are reacted with a saturated monobasic carboxylic acid, the best results are in general obtained when said alcohol possesses less than twelve carbon atoms to the molecule.

Ordinarily, the esterification is effected without resorting to the use of a catalyst, however, when unsaturated alcohols which do not possess an unsaturated tertiary carbon atom are reacted, the reaction rate may be accelerated by the application of a small amount of a mineral acid or acid acting substance. We do not employ a mineral acid or acid acting catalyst when an unsaturated alcohol possessing an unsaturated tertiary carbon atom is esterified, since we have found that under the conditions of operation the presence of an acidic substance catalyzes the rearrangement of the unsaturated alcohol to the corresponding saturated aldehyde or ketone.

Suitable catalysts, which may be used to accelerate the rate of esterification of those unsaturated alcohols which do not possess an unsaturated tertiary carbon atom, include the strong mineral acids such as $H_2SO_4$, $H_3PO_4$, $H_2S_2O_7$, $HPO_3$, $HCl$, $HBr$, $H_4P_2O_7$, $HClO_3$, $HClO_4$, $HNO_3$, and the like. We may also utilize mineral acid constituents such as $SO_2Cl_2$, $SOCl_2$, $SOBr_2$, $NO_2$, $N_2O_3$, $NOCl$, $POCl_3$, $PCl_3$, $PCl_5$, and the like. We may also employ suitable hydrogen acid acting salts such as $ZnSO_4$, $ZnCl_2$, $ZnBr_2$, $FeCl_3$, $AlCl_3$, $CoCl_2$, $NiCl_2$, $Fe_2(SO_4)_3$, $Al_2(SO_4)_3$, $NaHSO_4$, $NaH_2PO_4$ and the like, or we may employ organic acid acting compounds such as benzene sulphonic acid and its homologues and analogues, dialkyl and acid alkyl sulphates, alkylated phosphoric and sulphonic acids, etc.

The term "carboxylic acid" as used in this specification and the accompanying claims is intended to include those organic compounds characterized by possessing at least one organic acid carboxyl group. The carboxylic acids suitable for use in the execution of the present invention may be of aliphatic, cyclic or aralkyl character and may be saturated or unsaturated and possess one or a plurality of carboxyl groups and may or may not be further substituted. Suitable carboxylic acids include among others acids such as formic, acetic, propionic, butyric, isobutyric, valeric, acrylic, propiolic, crotonic, tiglic, benzoic, phenyl acetic, cinnamic, oxalic, malonic, succinic, glutaric and the like and their homologues, analogues and substitution products. Suitable hydroxyl, halogen and carbonyl substituted carboxylic acids include lactic, glycollic, hydroxybutyric, malic, citric, glyoxalic, pyruvic, acetoacetic, chlor-acetic, alpha- and beta- chlor-propionic, chlor-isobutyric and the like acids and their homologues, analogues and substitution products.

Our invention may be executed in a wide variety of manners. In a preferred mode of operation, the esterification is effected by heating the unsaturated alcohol in contact with an excess of a carboxylic acid. The reactants are introduced into a suitable reaction vessel equipped with means for agitating and heating its contents. The reactants may be introduced into the reaction vessel independently or they may be mixed prior to their introduction therein. Ordinarily, we prefer to employ an excess of the carboxylic acid over the unsaturated alcohol, however, when desired, an excess of the alcohol or equimolecular quantities of the reactants may be used.

In the majority of cases, the esterification is effected by heating the reactants in contact with each other at the boiling temperature of the reaction mixture under atmospheric pressure. The rate of the reaction may be accelerated by resorting to the use of superatmospheric pressure and higher temperatures. It is desirable that intimate contact of the reactants be effected by some suitable agitating means such as mechanical stirring.

The present invention may be executed at any suitable temperature and pressure. The reaction temperature to be employed will depend on the particular reactants, the stability of the reaction product, the method of recovery to be resorted to and on the desired pressure of operation. Relatively low reaction temperatures may be used, in some cases, and the removal of the unsaturated ester or its azeotrope comprising any of the constituents of the reaction mixture may be effected by operating with the reaction system under subatmospheric pressures. When it is desirable to operate at temperatures higher than the atmospheric boiling temperature of the reaction mixture, superatmospheric pressures may be applied.

We may increase the rate of the esterification reaction and prevent the occurrence of undesirable side reactions such as polymerization, condensation and hydrolysis of the reaction product by operating in such a manner that the unsaturated ester and/or water are removed from the reaction mixture substantially as soon as they are formed. This removal is best effected by executing the process at a temperature sufficiently high to permit distillation of the ester and/or water from the reaction mixture. We may operate with a distilling or fractionating apparatus in communication with the reaction vessel in such a manner that vapors from the latter are introduced into a suitable portion of the separating column. We may, in some cases, operate the distilling apparatus under a heavy reflux and distill azeotropic mixtures comprising the unsaturated ester, water and other constituents of the reaction mixture from the reaction vessel. The mixtures distilled are multiple azeotropic mixtures of the ester and water with the alcohol and/or acid or mixtures which while not of azeotropic composition nevertheless boil at temperatures lower than the boiling temperature of their constituents. It may be desirable to aid the removal of the ester and/or water by effecting the reaction in the presence of an inert substance which will evaporate under the conditions of operation and form low boiling azeotropic mixtures with the reaction products. Suitable substances for this purpose include hydrocarbons, alcohols, ethers, esters and the like.

The vapors removed from the reaction vessel may be condensed and the unsaturated ester recovered therefrom by any suitable means such as stratification, fractionation, extraction, use of drying agents and the like. The unsaturated esters may be recovered in a substantially pure state by subjecting the condensate to treatment in a series of suitable fractionating columns. The particular recovery system to be employed is dependent on the physical and especially on the azeotropic properties of the condensate and its constituents. Any unreacted alcohol and/or carboxylic acid recovered from the condensate may be conducted back to the reaction vessel for re-utilization therein.

In some cases the unsaturated ester cannot be separated from the reaction vessel under the conditions of temperature and pressure at which the esterification is effected. We may, however, accelerate the reaction and substantially prevent hydrolysis of the ester formed by distilling the water from the reaction mixture substantially as soon as it is formed, or we may effect the reaction in the presence of suitable organic or inorganic substances capable of combining with the water formed such as anhydrous salts which can add water of crystallization. Other similar or related expedients may be availed of to increase the efficiency of the operation. For example, the reaction may be conducted in the presence of a substance capable of combining with the water and thereby removing it from the reaction mixture substantially as soon as it is formed. When the reaction is complete the unsaturated ester may be separated from the reaction mixture by distillation, centrifugation, extraction or any other suitable means. In some cases the reaction mixture may be used for solvent and extraction purposes and as an intermediate for the production of other organic compounds without resorting to separation of the constituents.

It will be apparent that our process may be executed in a batch, intermittent or continuous manner. When it is desired to execute our invention in a continuous manner in accordance with the above described mode of procedure, we may have a suitable reaction stage or stages in communication with one or a plurality of separation and purification stages. The volume of the reaction mixture and the relative concentrations of the reactants in the reaction stage or stages may be kept substantially constant by the intermittent or continuous introduction therein of the reactants at about the same rate at which they are reacted and the products removed from the reaction mixture. The reactants separated from the reaction products in the ester recovery stage or stages may be returned to the reaction stage as a mixture, independently or in conjunction with the main reactant feed or feeds.

As an alternative mode of operation, the esterification may be effected in a reaction column into which the reactants may be introduced at one or a plurality of zones; the location of said zones being dependent on the relative boiling temperatures of the particular reactants, products and constant boiling mixtures which may be formed.

Unsaturated esters may be prepared by reacting a single unsaturated alcohol of the type herein described with a single carboxylic acid. Thus the character of the unsaturated ester may be controlled by varying the character of the interacting alcohol and/or carboxylic acid. On the other hand mixed esters may be prepared by reacting a mixture of different species of unsaturated alcohols with a single acid or a single alcohol may be reacted with a mixture of different species of carboxylic acids. The resulting mixtures of esters may be used without resorting to separation of the constituents or the separation of the esters may be effected by any suitable means. For example, if there is a sufficiently great difference in the boiling temperatures of the esters, they may be separated by fractionation.

The following examples are introduced for the purpose of illustrating the mode and conditions of execution of our invention when certain specific unsaturated esters are prepared.

*Example I*

100 gm. (1.39 mols) of anhydrous buten-1-ol-4 (CH$_2$=CH—CH$_2$—CH$_2$OH) were mixed with 150 gm. (2.5 mols) of glacial acetic acid and the mixture placed in the kettle of a distilling apparatus.

The reaction mixture was heated to its boiling temperature and the distilling column adjusted so that the contents of the reaction vessel were very slowly distilled under a heavy reflux. The distillate thus removed was found to consist of the acetate of buten-1-ol-4, water, buten-1-ol-4 and some acetic acid.

Due to the fact that the reaction proceeded rather slowly, the operation was discontinued and three drops of concentrated sulphuric acid were added to the reaction mixture in the kettle. The distillation was then continued as before. It was found that the addition of the catalyst caused the esterification to proceed at a greatly accelerated rate.

The operation was continued until no more unsaturated ester could be detected in the distillate. The condensed distillate was washed with water to remove the unreacted alcohol, treated with NaHCO$_3$ to neutralize the acetic acid, dried and fractionated. It was observed that no butyraldehyde was formed by catalytic rearrangement of the buten 1-ol-4.

The reaction product was the acetate of buten-1-ol-4 having the formula (CH$_2$=CH—CH$_2$—CH$_2$—OOCCH$_3$)

and boiling at 125° C. under a pressure of about 750 mm. of mercury.

*Example II*

200 gm. (2.33 mols) of anhydrous 2-methyl-butene-1-ol-4

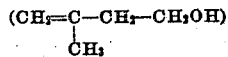
(CH$_2$=C—CH$_2$—CH$_2$OH)
          |
         CH$_3$ were mixed with 264 gm. (3.0 mols) of isobutyric acid and the mixture charged to the kettle of a fractionating still. The mixture in the reaction vessel was heated to its boiling temperature and distilled under a heavy reflux.

The distillate consisted of a mixture of iso-pentenyl isobutyrate, water, isopentenol and a small amount of isobutyric acid.

The distillate was washed with water to remove the unreacted alcohol, neutralized with NaHCO$_3$, dried and fractionated under subatmospheric pressure.

The reaction product was the unsaturated ester of the formula

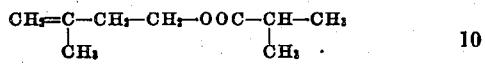
CH$_2$=C—CH$_2$—CH$_2$—OOC—CH—CH$_3$
       |                    |
      CH$_3$                CH$_3$ The unsaturated ester was obtained in a yield of about 85%.

*Example III*

200 gm. (2.0 mols) of anhydrous 2-methyl-pentene-1-ol-4 were mixed with 185 gm. (2.5 mols) of anhydrous normal propionic acid and the mixture placed in the kettle of a fractionating still.

The contents of the kettle were slowly distilled under a heavy reflux. The condensed distillate was washed with water, neutralized, dried and fractionated.

278 gm. (1.78 mols) of the unsaturated ester of the formula

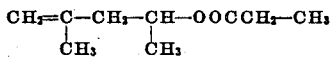
CH$_2$=C—CH$_2$—CH—OOCCH$_2$—CH$_3$
       |        |
      CH$_3$   CH$_3$ were obtained as the main reaction product. This represents a yield of 88% calculated on the unsaturated alcohol applied.

*Example IV*

200 gm. (1.75 mols) of anhydrous 2,4-dimethyl pentene-1-ol-4

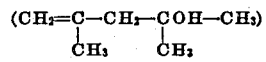
(CH$_2$=C—CH$_2$—COH—CH$_3$)
       |         |
      CH$_3$    CH$_3$ were mixed with 176 gm. (2.0 mols) of anhydrous isobutyric acid and the mixture was placed in a reaction vessel equipped with a fractionating column.

The reaction mixture was heated to its boiling temperature and distilled slowly from the reaction system with the fractionating column adjusted so that nearly all the vapors ascending the column were condensed and returned to the reaction mixture.

When substantially all of the liquid had been distilled from the reaction vessel, the operation was terminated. The condensed distillate was washed with water, neutralized, dried and fractionated.

292 gm. (1.59 mols) of the unsaturated ester of the formula

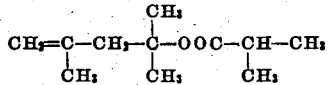
              CH$_3$
               |
CH$_2$=C—CH$_2$—C—OOC—CH—CH$_3$
       |       |        |
      CH$_3$  CH$_3$   CH$_3$ were obtained as the main reaction product. This novel unsaturated ester was obtained in a yield of about 91%.

*Example V*

113 gm. (0.896 mol.) of oxalic acid ((COOH)$_2$.2H$_2$O)

were mixed with 250 gm. (3.5 mols) of anhydrous buten-1-ol-4 (CH$_2$=CH—CH$_2$—CH$_2$OH) and the mixture was charged to the kettle of a dehydrating still.

This mixture was heated to its boiling point and distilled very slowly under a heavy reflux until no more water could be removed. It was found that the condensed distillate contained only water and buten-1-ol-4. No rearrangement of the unsaturated alcohol to its corresponding carbonylic compound could be detected.

When no more water could be removed from the reaction vessel, the residue in the still was fractionated under a subatmospheric pressure. The product obtained was the unsaturated oxalate of the formula

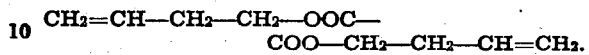
CH$_2$=CH—CH$_2$—CH$_2$—OOC—
COO—CH$_2$—CH$_2$—CH=CH$_2$.

This product was obtained in a yield of about 82%.

Example VI 113 gm. (0.896 mol.) of oxalic acid were mixed with 301 gm. (3.5 mols) of 2-methyl-butene-1-ol-4

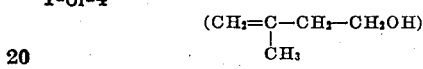
(CH$_2$=C—CH$_2$—CH$_2$OH)
      |
      CH$_3$ and the mixture was charged to the kettle of a dehydrating still.

The mixture was heated to its boiling point and a mixture comprising water and the unsaturated alcohol was allowed to slowly distill from the system with the fractionating column operating under a heavy reflux. The distillation was continued until no more water could be detected in the distillate. The distillate was found to contain about 30 gm. (0.35 mol.) of a mixture of isovaleraldehyde and methyl isopropyl ketone formed by rearrangement of the unsaturated alcohol. Oxalic acid is of sufficient acid strength to act as a mineral acid rearrangement catalyst.

The residue in the still was fractionated under a subatmospheric pressure. The product obtained was the unsaturated oxalate of the formula CH$_2$=C—CH$_2$—CH$_2$—OOC—COO—CH$_2$—CH$_2$—C=CH$_2$
      |                                           |
      CH$_3$                                       CH$_3$ The product was obtained in a yield of 65%. The recovered isopentenol was dried and re-utilized.

Example VII 500 gm. (5.0 mols) of 2-ethyl-buten-1-ol-4

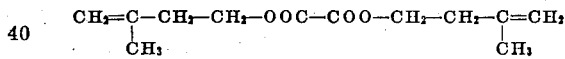
(CH$_2$=C—CH$_2$—CH$_2$OH)
      |
      C$_2$H$_5$ were mixed with 370 gm. (2.5 mols) of cinnamic acid (C$_6$H$_5$—CH=CH—COOH) and the mixture was charged to the kettle of a dehydrating still.

The mixture was heated at the boiling point of the alcohol and a constant boiling mixture of alcohol and water was distilled from the system under a heavy reflux. The distillate was allowed to stratify, water was separated and the alcohol was continuously returned to the reaction mixture.

When no more water could be detected in the distillate, the excess of unsaturated alcohol was distilled from the flask at a subatmospheric pressure. The residue was found to be mainly the unsaturated ester of the formula

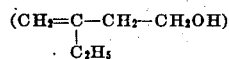
CH$_2$=C—CH$_2$—CH$_2$—OOC—CH=CH—C$_6$H$_5$
      |
      C$_2$H$_5$

Example VIII 200 gm. (1.79 mols) of heptadien-1,6-ol-4

(CH$_2$=CH—CH$_2$—CHOH—CH$_2$—CH=CH$_2$)

were mixed with 264 gm.) 3.0 mols of isobutyric acid. This mixture was charged to a fractionating still wherein it was heated to its boiling temperature and slowly distilled under a very heavy reflux.

The condensed distillate was found to be a mixture comprising an unsaturated isobutyrate, water, some unsaturated alcohol and a small amount of isobutyric acid. This mixture was washed with water to remove the unsaturated alcohol, neutralized with NaHCO$_3$, dried and fractionated under a subatmospheric pressure.

The product was the unsaturated ester of isobutyric acid of the formula

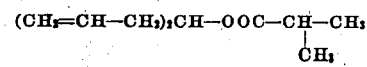
(CH$_2$=CH—CH$_2$)$_2$CH—OOC—CH—CH$_3$
                              |
                              CH$_3$ This compound, which is a novel composition of matter was obtained in a yield of 78%.

Example IX 116 gm. (2.0 mols) of 2-(hydroxy-ethyl)-butene-1-ol-4

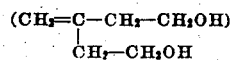
(CH$_2$=C—CH$_2$—CH$_2$OH)
      |
      CH$_2$—CH$_2$OH and 120 gm. (2.0 mols) of glacial acetic acid were mixed and the mixture charged to the kettle of a dehydrating still.

The mixture was heated at its boiling point and water formed during the reaction was distilled from the reaction vessel at substantially the same rate at which it was formed.

When the reaction was complete as indicated by the fact that no more water could be removed, the contents of the reaction vessel were distilled under a subatmospheric pressure.

The main reaction product was the unsaturated hydroxy acetate of the formula

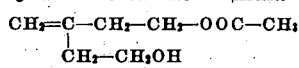
CH$_2$=C—CH$_2$—CH$_2$—OOC—CH$_3$
      |
      CH$_2$—CH$_2$OH

This product was obtained in a yield of about 80%.

158 gm. (1.0 mol.) of the above obtained hydroxy acetate were charged to the kettle of a dehydrating still and 60 gm. (1.0 mol.) of glacial acetic acid was added. This mixture was heated and water distilled from the reaction mixture substantially as described above.

When the reaction was complete, the contents of the kettle were distilled at a subatmospheric pressure.

The main reaction product was the unsaturated acetate of the formula

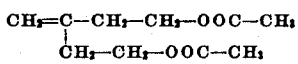
CH$_2$=C—CH$_2$—CH$_2$—OOC—CH$_3$
      |
      CH$_2$—CH$_2$—OOC—CH$_3$ The product was obtained in a yield of about 85%.

The unsaturated esters which can be prepared by our method may be used as solvents for numerous dilution and extraction purposes. They possess a high solvent power and are particularly useful when a high boiling solvent or extraction medium is required. The esters may also be advantageously used in coating compositions, as softeners for pyroxylin, cellulose esters and resins. They may under certain conditions be hydrolyzed and rearranged to valuable carbonylic compounds and the corresponding acid. The esters obtained may vary in consistency from liquid to wax-like solids at room temperature. The solid or liquid wax-like esters may be used as substitutes for paraffin wax or the various vegetable waxes in polishes, waterproofing compositions, etc. The unsaturated esters may have varied uses in perfumery and pharmaceutical chemistry.

It is to be understood that in this invention it is our intention to exclude the esterification of allyl type alcohols. By an allyl type alcohol, we mean an unsaturated alcohol such as allyl alcohol and its homologues and substitution products wherein a carbinol group is linked to an unsaturated carbon atom. The esterification of allyl type alcohols is being claimed in a copending application (Serial No. 725,967, filed May 16, 1934), and hence this specification and the accompanying claims are so worded as to exclude this class of unsaturated alcohols.

We claim as our invention:

1. The process for the production of unsaturated esters which comprises reacting an unsaturated alcohol containing at least one aliphatic unsaturated tertiary carbon atom linked to three other carbon atoms and a carbinol group linked to a saturated carbon atom with a carboxylic acid.

2. The process for the production of unsaturated esters which comprises reacting an unsaturated alcohol containing a carbinol group linked to a saturated carbon atom with an unsaturated carboxylic acid containing at least one carboxyl group linked to an aliphatic carbon atom.

3. The process for the production of unsaturated esters which comprises reacting an unsaturated alcohol containing a carbinol group linked to a saturated carbon atom, said alcohol also possessing a carbon atom linked to three other carbon atoms with a polybasic carboxylic acid containing at least one carboxyl group linked to an aliphatic carbon atom.

4. The process for the production of unsaturated esters which comprises reacting an unsaturated monohydric primary alcohol containing at least one aliphatic unsaturated tertiary carbon atom linked to three other carbon atoms and the carbinol group linked to a saturated carbon atom with a carboxylic acid.

5. The process for the production of unsaturated esters which comprises reacting a compound of the class consisting of unsaturated secondary and tertiary alcohols containing a carbinol group linked to a saturated carbon atom with a carboxylic acid.

6. The process for the production of unsaturated esters which comprises reacting an unsaturated secondary alcohol containing a carbinol group linked to a saturated carbon atom with a carboxylic acid.

7. The process for the production of unsaturated esters which comprises reacting a compound of the class consisting of unsaturated polyolefinic secondary and tertiary alcohols with a carboxylic acid.

8. The process for the production of unsaturated esters which comprises reacting an unsaturated alcohol of the structure

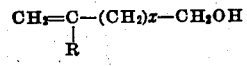

wherein $x$ represents an integer and R represents a hydrocarbon radical, with a carboxylic acid.

9. The process for the production of unsaturated esters which comprises reacting an unsaturated alcohol of the formula

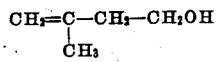

with a carboxylic acid.

10. The unsaturated ester corresponding to the reaction product of an unsaturated alcohol containing a carbinol group linked to a saturated carbon atom with an unsaturated carboxylic acid.

11. The unsaturated ester corresponding to the reaction product of an unsaturated alcohol containing a carbinol group linked to a saturated carbon atom with isobutyric acid.

12. The unsaturated ester of the structure

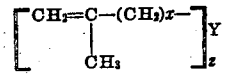

wherein $x$ represents an integer and Y represents a carboxylic radical possessing a plurality of carboxyl groups, $z$ representing an integer not greater than the number of carboxyl groups possessed by Y.

13. The unsaturated ester of the structure

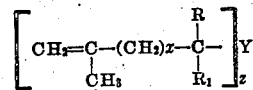

wherein $x$ represents an integer and Y represents a carboxylic radical possessing $z$ carboxyl groups, R representing a hydrocarbon radical and $R_1$ representing hydrogen or an organic radical.

14. The unsaturated ester of the structure

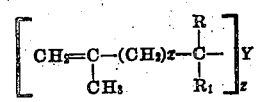

wherein $x$ represents an integer and Y represents a carboxylic radical possessing a plurality of carboxyl groups and $z$ represents an integer less than the number of carboxyl groups possessed by Y, R representing a hydrocarbon radical and $R_1$ representing hydrogen or an organic radical.

HERBERT P. A. GROLL.
GEORGE HEARNE.